United States Patent
Muthukumaran

(10) Patent No.: US 8,256,671 B2
(45) Date of Patent: Sep. 4, 2012

(54) PROGRESSIVE CATEGORATION AND TREATMENT OF REFUND ABUSERS

(75) Inventor: Arun Muthukumaran, San Jose, CA (US)

(73) Assignee: eBay Inc., San Jose, CA (US)

( * ) Notice: Subject to any disclaimer, the term of this patent is extended or adjusted under 35 U.S.C. 154(b) by 578 days.

(21) Appl. No.: 12/481,031

(22) Filed: Jun. 9, 2009

(65) Prior Publication Data

US 2010/0312676 A1 Dec. 9, 2010

(51) Int. Cl.
*G06Q 10/00* (2006.01)
(52) U.S. Cl. .................. 235/383; 705/304
(58) Field of Classification Search .......... 235/380, 235/383, 376; 705/28, 30, 32, 38, 39, 41, 705/7.15, 26.1, 26.35, 26.61, 26.62, 26.81, 705/303, 304, 309; 702/82
See application file for complete search history.

(56) References Cited

U.S. PATENT DOCUMENTS

| | | | |
|---|---|---|---|
| 5,791,991 A * | 8/1998 | Small | 463/41 |
| 5,895,450 A * | 4/1999 | Sloo | 705/309 |
| 6,574,614 B1 * | 6/2003 | Kesel | 706/52 |
| 6,684,188 B1 * | 1/2004 | Mitchell et al. | 705/3 |
| 6,938,000 B2 * | 8/2005 | Joseph et al. | 705/304 |
| 7,318,047 B1 * | 1/2008 | Foth et al. | 705/39 |
| 7,383,200 B1 * | 6/2008 | Walker et al. | 705/7.15 |
| 7,539,644 B2 * | 5/2009 | Hu et al. | 705/38 |
| 7,600,017 B2 * | 10/2009 | Holtzman et al. | 709/224 |
| 7,657,441 B2 * | 2/2010 | Richey et al. | 705/1.1 |
| 7,698,162 B2 * | 4/2010 | Vaccarelli et al. | 705/7.32 |
| 7,707,149 B2 * | 4/2010 | Lee et al. | 707/999.01 |
| 7,711,653 B1 * | 5/2010 | Denham et al. | 705/304 |
| 7,822,643 B2 * | 10/2010 | Negley | 715/723 |
| 7,844,553 B2 * | 11/2010 | Whitehouse | 705/331 |
| 7,870,066 B2 * | 1/2011 | Lin et al. | 705/39 |
| 7,896,243 B2 * | 3/2011 | Herskovitz | 235/383 |
| 7,941,370 B2 * | 5/2011 | Paulsen et al. | 705/39 |
| 7,953,636 B2 * | 5/2011 | Steuart et al. | 705/24 |
| 8,061,596 B2 * | 11/2011 | Hogg et al. | 235/380 |
| 8,061,597 B2 * | 11/2011 | Hogg et al. | 235/380 |
| 8,117,087 B2 * | 2/2012 | Michaelis et al. | 705/26.9 |
| 2004/0044586 A1 * | 3/2004 | Gullo et al. | 705/26 |

* cited by examiner

*Primary Examiner* — Andrew Joseph Rudy
(74) *Attorney, Agent, or Firm* — Haynes and Boone, LLP

(57) ABSTRACT

Various methods and systems are provided to manage on-line transactions by categorizing users who request refunds of purchases (e.g., digital goods) and requiring certain conditions to be met before a refund is issued or processed. The conditions change for different categories of users. In one embodiment, a refund process is made progressively harder or burdensome as users are categorized in worsening refund abuse categories.

27 Claims, 4 Drawing Sheets

US 8,256,671 B2

PROGRESSIVE CATEGORIZATION AND TREATMENT OF REFUND ABUSERS

BACKGROUND

1. Field of the Invention

The present invention generally relates to on-line purchases and purchasers and in particular to methods of handling on-line purchasers.

2. Related Art

More and more consumers are purchasing items and services over electronic networks, such as the Internet. Consumers routinely search for and purchase products and services from merchants and individuals alike. The transactions can take place directly between an on-line merchant or retailer and the consumer, where payment is typically made by entering credit card or other financial information. Transactions can also take place with the aid of an on-line payment provider, such as PayPal, Inc. of San Jose, Calif. Such payment providers can make transactions easier and safer for the parties. Purchasing through the Internet from the convenience of a consumer's home, office, or virtually anywhere (with mobile devices) is one main reason why on-line purchases are growing faster and faster.

However, with the proliferation and ease of on-line purchasing, abuse of on-line purchasing has also increased, especially with the growing popularity of digital goods through social networking sites, such as Facebook and MySpace. An expanding area of abuse is with returns or refunds of purchased items. For example, a user may purchase a digital good, such as a virtual beer or virtual flowers, to send to someone on a social networking site. After downloading or sending the digital good, the user may then request a refund from the merchant, with or without cause. For the latter, many merchants allow unconditional refunds on purchases of digital goods or other types of items, as a means to promote sales and use. Even if the digital goods are very inexpensive, e.g., 99 cents, the volume of refunds can result in both a not insignificant revenue loss for the merchant and large losses of time processing the refund request for the payment provider and/or the merchant. With digital goods, the consumer realizes the benefit (e.g., ability to download or send the good), without any cost (a refund of the purchase price).

One response to users abusing refund policies is to increase the requirements for a refund. This may include requiring a purchaser to provide a reason for the return, allowing returns only within a certain time period, giving only partial returns once the good or item is purchased, or something as harsh as an absolute no-refund policy. However, increasing requirements for refunds may reduce the effectiveness of the merchant's goals to attract consumers to the site and for purchases.

Thus, there is a need for a more effective way handling on-line refunds without alienating desirable consumers.

SUMMARY

In accordance with an embodiment of the invention, a system and method first categorizes or rates users or purchasers within two or more categories of refund "abusers" and makes the process of obtaining a refund for higher abusers more difficult than with lesser abusers. Categorization of abusers can be by any suitable method or algorithm, such as based on the number of refunds made during a specified period of time, the time between a purchase and a refund request, the total dollar amount of refunds, and/or purchase and refund history of the user with a particular merchant. The refunds can be based on digital goods, such as apps or objects sent in MySpace, Facebook, etc., or physical goods. In one embodiment, abusers are placed in three categories: 1) low abuser, which includes non-abusers, 2) medium abuser, and 3) high abuser.

In one example, a low abuser simply complies with the standard policy for refunds, which may be stating a reason for the refund and replying to a short Captcha (e.g, 5 characters). The refund is then processed and the funds are received in the consumer's account quickly, e.g., one business day. Medium abusers may be required to answer specific questions, e.g., 5, reply to a longer Captcha (e.g., 10 characters), and then wait a longer time for the refund to show up (e.g., 3-5 business days). High abusers are then required to go through an even more difficult and time-consuming process, for example, answering more specific questions (e.g., 10), replying to an even longer Captcha (e.g., 15 characters), and then waiting an even longer time for the refund to be processed (e.g., 7-10 business days). High abusers may even be subject to the merchant refusing to accept further transactions from the high abuser.

The categorization of abusers may be dynamic, such that an individual can be moved between different categories of abusers, based on changes to the user profile. For example, if the abuser has made numerous purchases without refund requests, the abuse may be moved from a medium abuser rating to a low abuser rating. Conversely, if an abuser makes many purchases and refund requests within a short period of time, the abuser may move from a low abuser rating to a high abuser rating. Notifications can be made to users whenever a user's abuser rating changes.

As a result, non-abusers or low abusers still enjoy the convenience of purchases and refunds, and the merchant still can attract these desirable consumers. However, consumers who continually purchase and refund will be deterred from either purchasing or requesting refunds, due to the higher inconvenience for the user.

These and other features and advantages of the present invention will be more readily apparent from the detailed description of the embodiments set forth below taken in conjunction with the accompanying drawings.

Figure 1:
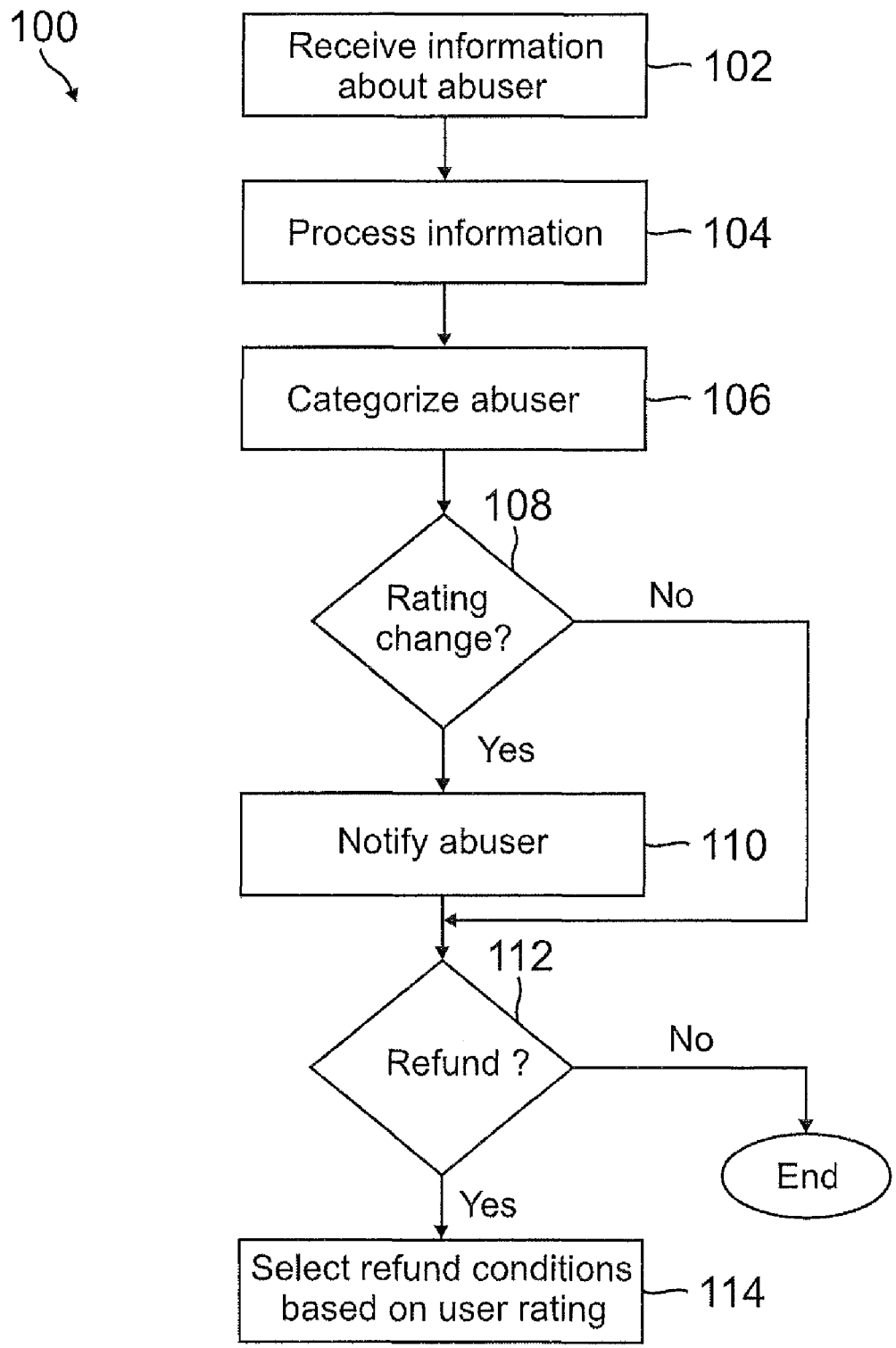
FIG. 1 is a flowchart showing a process performed by a payment provider or merchant for handling a refund request from a user according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIG. 1 is a flowchart 100 showing processes made by a payment provider or merchant for handling consumers who request refunds from purchases, according to one embodiment of the present disclosure. Consumers may include individuals or entities who first make a purchase. Typically, the purchase is made on-line, but the purchase made be made in person, such as at a point of sale, or other suitable method. In one example, the consumer locates a digital good for purchase, such as through an Internet browser. Note that although digital goods are described, purchase and returns of physical goods may also be suitable. The digital good may be on a social networking site, such as Facebook or MySpace. On the social networking site, the consumer may be given the option of purchasing a digital good, for example a digital or virtual beer or flowers, to send to someone else on the networking site or for personal use, such as for an avatar. The purchase may be made directly with the networking site or through a payment provider, such as PayPal, Inc. of San Jose, Calif. Once purchased, the consumer may use the digital good, such as sending it to others or downloading for the consumer's own use.

After use, the consumer may decide to return the good and request a refund for any number of reasons. There are legitimate reasons, such as the good being defective (e.g., not accessible or downloadable), different than advertised (e.g., receiving a different digital good than what was shown), or poor quality (e.g., the received image was blurred, distorted, or of low resolution). There are also reasons that, while allowed by the merchant or site guidelines, may be dishonest and aim to abuse the refund policies of the merchant or site. One such example is a site that has a "no questions asked" refund policy, which allows the consumer to obtain a refund simply by requesting one. The consumer retains or has already used the digital good, but is still given a refund per the guidelines. Such guidelines may be used because 1) the cost of the digital good for the merchant or site is so low, 2) the purchase price of the digital good is low, 3) desire to attract more users/consumers to the site, and 4) reduce or eliminate the work needed to process refund requests for such low value/cost items. Merchants may tolerate and expect consumers will purchase digital goods, use them, and ask for a refund. However, if this becomes prevalent, either with multiple consumers or with a single consumer who abuse the system, the merchant may want to address this specifically, while not alienating consumers who do not abuse the system.

Returning to FIG. 1, the merchant, site, and/or payment provider receives information about the "abuser" at step 102 As used herein, "abuser" refers to consumers who make a purchase. The consumer does not necessarily have to requested a refund previously, either warranted or unwarranted. Information about the abuser may include the length of time the consumer has been a customer of the site, number of refunds requested and given within a time period, e.g., the last 30 days, the number of purchases made within a time period, the percentage of refunds from purchases made over a time period, the average number of days between a purchase and a refund, the total dollar value of refunds, the average dollar value of a refund, and/or the total dollars spent at the site, merchant, or with the payment provider. Depending on the algorithm or methodology used, some, all, or additional information may be provided.

Next, at step 104, the information is processed to rate or categorize the abuser. Processing may include determining which information is needed and which is not. The useful or relevant information is applied to a suitable algorithm to obtain a value or rating for the abuser. In one embodiment, the relevant information includes the percentage of refunds in the past month and the number of days between a purchase and a refund request. The percentage of refunds can be calculated by dividing the number of refunds requested in the past month by the number of purchases made in the past month. Thus, the percentage number can be any number between 0 (representing an abuser who has not requested any refunds in the past month with at least one purchase) to 100 (representing an abuser who has requested refunds for all purchases made in the past month). If the rating is the first time for the abuser, i.e., the abuser has not been rated before, the number of days is the average number of days between purchase and refund. If the rating is for an update to an existing abuser rating, the number of days is the number of days between the most recent purchase and refund. An average number of days can also be used for updating an abuser rating. The number of days can be anywhere between 0 (representing an abuser who made a purchase and a refund request on the same day) and 300 or more (representing an abuser who has kept a purchased good for a very long time before requesting a refund). A high number of days may indicate undesirable abusers who gain the advantage of a purchased good for a long time and then ask for their money back. This information can be used to calculate a number that places the abuser in a certain category, as will be discussed below, or the information can be processed and placed within categories.

In one embodiment, there are three categories of abusers. Note that there can be any number, and the use of three is just one example. The three categories can be "low" abuse, "medium" abuse, and "high" abuse. If the information is processed to place ranges within a category, a percentage ranging from 0 to 30 can be low abuse, 30+ to 40 can be medium abuse, and 40+ to 100 can be high abuse in this example. Number of days between a purchase and refund ranging from zero to two days can be low abuse, over two days up to five days can be medium abuse, and over five days can be high abuse.

This processed information is then used, at step 106, to categorize or rate the abuser, e.g., assigning a value to the abuser and then using the value to categorize the abuser. Continuing with the example, abuse points or value ranging from 0 to 0.6 is low abuse, 0.601 to 2 is medium abuse, and 2.0+ on up is high abuse. This corresponds to multiplying the refund rate (percentage) with the time between purchase and refund. For example, in the low abuse category, the refund rate is 0 to 0.3 and the time between purchase and refund is 0 to 2, giving a range of 0 to 0.6. Similarly, in the medium abuse category, the refund rate of 0.30+ to 0.4 and the time of 2.0+ to 5.0 results in abuse points ranging from 0.6+ to 2.0. In the high abuse category, the refund rate of 0.4+ to 1.0 and the time range of 5.0+ on up gives a range of abuse points from 2.0+ on up.

In another embodiment, the categorization in step 106 can be determined by simply calculating an abuser's point value based on the abuser's information regardless of what category that information is placed into. Thus, using the above example, an abuser with a refund rate of 45% or 0.45 and a time between purchase and refund of only one day would have an abuse value of 0.45, which would place that abuser in the low abuse category (0 to 0.6).

Regardless of how an abuser is rated or categorized, once done, the abuser is placed in a category or is associated with a rating or point value. This new current rating may be better, worse, or the same as the previous rating. A better rating may be due the abuser reducing the percentage of refunds and/or reducing the number of days between purchase and refund. A worse rating may be due to the abuser increasing the percentage of refunds and/or increasing the number of days between purchase and refund. A same rating, which may be exactly the same or within a range defined as being the "same," may be due to the latest actions being consistent with the abuser's previous history. At step 108, the new rating or category is compared with the abuser's previous category or rating. If that has changed, the abuser may be notified of that change at step 110. Notification can be by email to the abuser or any other suitable method, including a text message, a call to the abuser, or a mailed letter. In addition to the new rating, the notification may also include conditions required for a refund that are associated with the new rating. In some embodiments, a user may be notified even if the rating has not changed.

Notifications are useful to inform abusers of their current ratings, but may also be useful for motivating abusers to improve their ratings. For example, if the abuser rating has improved, with easier requirements for obtaining refunds, the abuser may continue to try and improve or try and maintain the improved rating. If the abuser rating has gotten worse (along with more strenuous requirements for receiving a refund), the abuser may strive to improve the rating.

Next, at step 112, the merchant, site, or payment provider determines whether the abuser is requesting a refund. Updating the abuser's rating may be prompted without an actual refund request, such as if the abuser has purchased several goods recently, without any requests for return. If no refund was requested, the process ends, and the system waits for the next chance to update the abuser's rating, e.g., after a certain amount of time passes, after a purchase or refund, etc. However, if a refund was requested, the system selects, at step 114, the conditions the abuser will be required to meet before a refund is issued. The worse the abuser's categorization or rating is, the more difficult the refund process will be. The process can differ, as long as it is more difficult, burdensome, or inconvenient as the abuse rating goes up.

Figure 2:
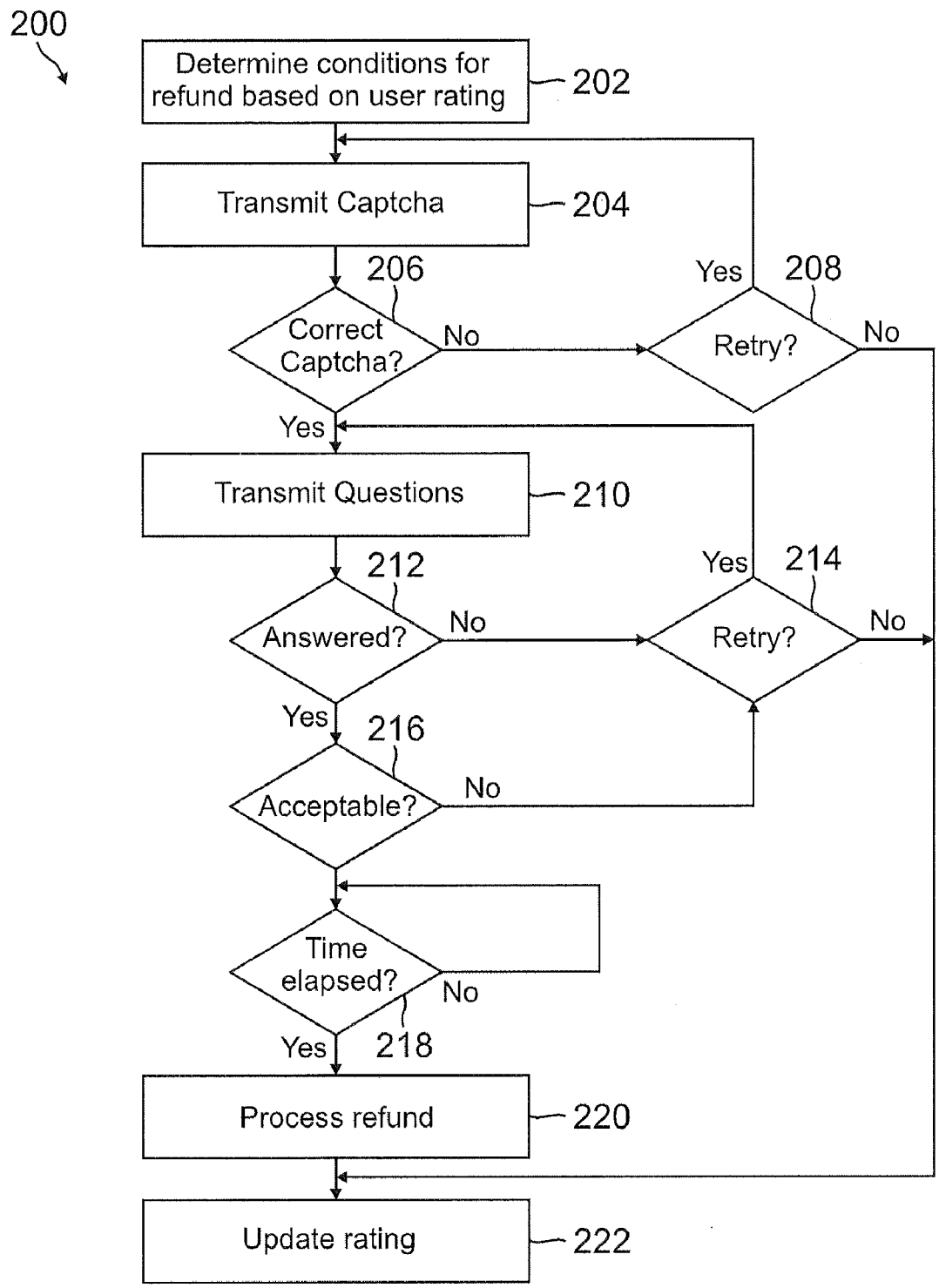
FIG. 2 is a flowchart showing a process performed by a payment provider or merchant for applying different conditions for a refund according to one embodiment.

FIG. 2 is a flowchart 200 showing processes made by a payment provider or merchant for applying a specific refund requirement to consumers requesting refunds based on the consumer's refund abuse rating, according to one embodiment. As discussed above, the requirements become more difficult or extensive as the abuser rating increases. Table 1 below list conditions required for the three abuse ratings in the example above according to one embodiment.

TABLE 1

| Abuse Rating | Low Abuse | Medium Abuse | High Abuse |
| --- | --- | --- | --- |
| Abuse Points | 0 to 0.6 | 0.6+ to 2 | 2+ on up |
| Captcha Size | 5 | 10 | 15 |
| Text Field Requirement | Yes | Yes | Yes |
| Number of Questions | 0 | 5 | 10 |
| Number of days before refund | 0 | 3-5 business days | 7-10 business days |
| Merchant can deny user | No | Yes | Yes |

At step 202, a determination is made as to which set of requirements are applicable to the user requesting a refund, based on the abuse rating or abuse points, i.e., whether the user has a low, medium, or high abuse rating. Once determined, the merchant, site, or payment provider sends the user a Captcha, with the size of the Captcha depending on the user abuse rating. For a low abuse rating, the Captcha size is five characters, for medium abuse, it is ten characters, and for high abuse, the Captcha size is 15 characters in length. Thus, high abusers are required to recognize and reply with longer Captchas than low or medium abusers. If, as determined at step 206, the Captcha received from the user is incorrect, the user may be notified and another Captcha is transmitted to the user if is allowed another try, as determined at step 208. If the user has not replied with a correct Captcha and the user has no more attempts, the refund request is not processed, and user rating is updated, which may be the same, higher, or lower, as discussed above with respect to FIG. 1. The user may be notified of the refund request being denied, reason(s) for the denial, and/or an updated abuse rating.

However, if as determined at step 206, the user has responded with a correct Captcha, a series of questions is transmitted to the user at step 210. There may be no questions if the user has a low abuse rating, five questions if the user has a medium abuse rating, and ten questions if the user has a high abuse rating. The questions may be the same or different between different abuse categories. For example, the questions may include objective questions, such as purchase date, method of payment, purchase date, received date, merchant name, etc., and/or subjective questions, such as reason(s) for return, satisfaction with merchant, etc. A determination is then made, at step 212, as to whether all the questions were answered by the user. If not, the user is notified, such as by a re-transmission of the question(s), assuming the user is allowed another try, as determined at step 214. If the user has not answered all the required questions and the user is not allowed another try, the refund is not processed, and the user rating is updated as needed at step 222.

If the required questions have all been answered, the next determination, at step 216, is whether the answers to the questions are acceptable. This may involve determining whether the answers to objective questions were correct, such as by comparing the answers to known information. For subjective questions, the length of the answer or whether the answer actually corresponds to the question asked may be determined. If an answer does not meet a length requirement or the answer does not appear to answer the question asked, the conclusion may be that the answer(s) are not acceptable. If that is the case, the user is allowed to re-enter answers until no more attempts are allowed. At that point, if the answers are still not acceptable, the user rating is updated as needed at step 222, and the refund request is denied.

However, if as determined at step 216, the answers are acceptable to the merchant, site, or payment provider, a determination is made as to whether the time requirement has been met at step 218. In this example, a low abuse user's request for a refund is processed immediately, a medium abuse user's request is processed in three to five business days, and a high abuse user's request is processed in seven to ten business days. If the time requirement has been met (e.g., the user has waited the required number of days), the refund request is processed at step 220, and the user receives the funds in a designated account, such as an account with the merchant or payment provider. Processing the refund may include notifying the user, such as by email or text, that the funds are now in the user's account (e.g., shown as a credit from the earlier purchase).

Once the refund is processed at step 220, the user's abuse rating is updated at step 222. In one embodiment, the merchant has the option of not accepting future transactions from the user. Thus, using the example above, if the user is categorized as a high abuse user, the merchant may decide to not allow the user to purchase any more goods at the merchant site or store. The payment provider may send a notice to the merchant asking the merchant whether it wishes to cancel the user's account. On instructions from the merchant, the payment provider and/or merchant takes the necessary steps to not allow any future transactions with the merchant. The payment provider may also elect to not handle any payment services for the user. The user may be notified of any such action. The user may also be notified before such action is taken, for example as a warning that if the refund requests continue, the user's account will be canceled with the merchant and/or payment provider. This advance warning, as opposed to a cancellation without warning, gives the user the opportunity to improve the abuse rating, which would be beneficial to both the user and merchant or payment provider.

Treating users differently based on how they are categorized or ranked as to refund abuse allows desirable users to continue with and take advantage of "easy" or "no questions asked" refund policies from merchants, while making it harder for refund abusers to obtain a refund. Making the refund process progressively harder or more burdensome may discourage users from abusing a merchant's refund policy and/or give a merchant or payment provider the option of canceling an undesirable user's account.

Figure 3:
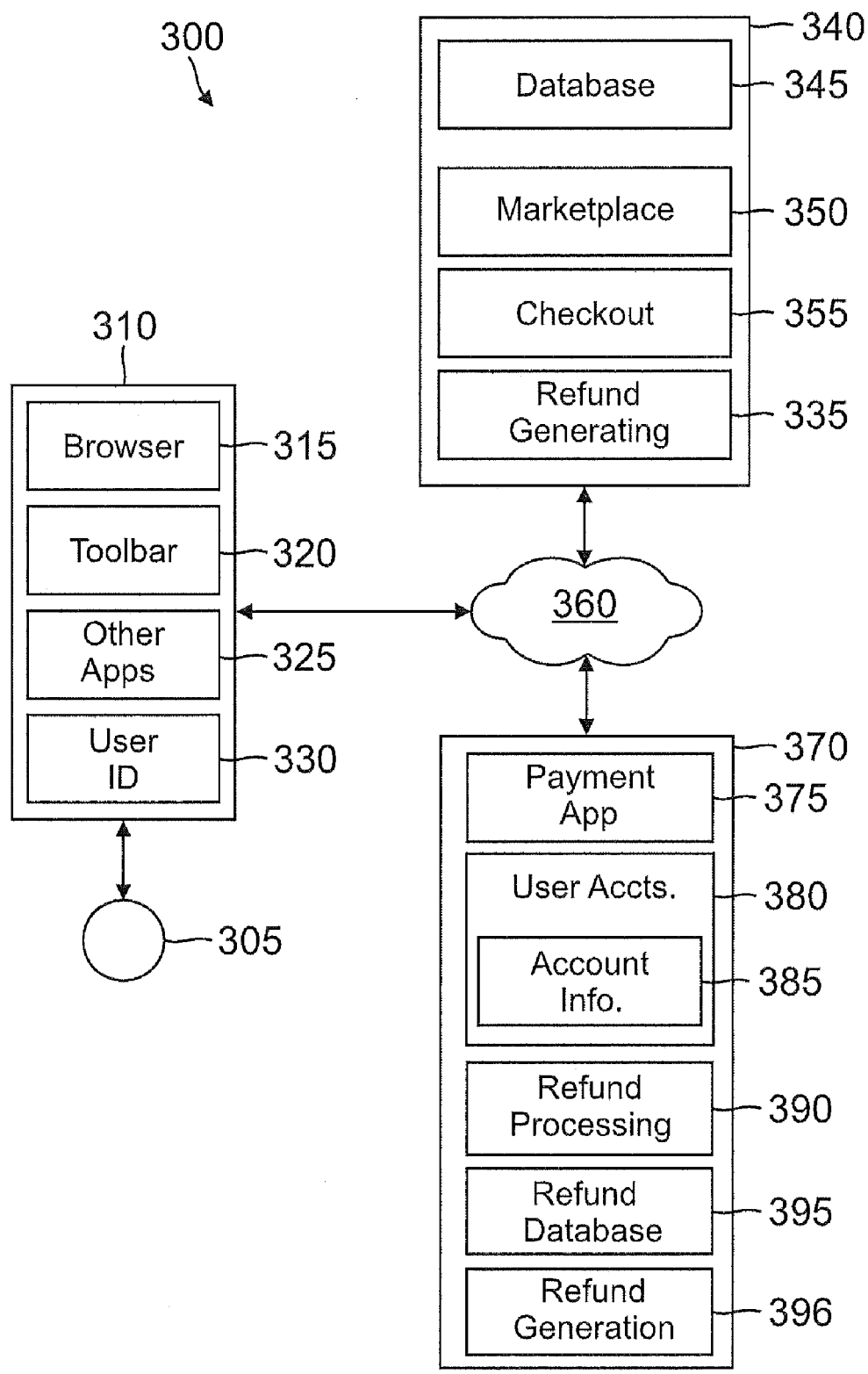
FIG. 3 is a block diagram of a networked system configured to handle refund requests in accordance with an embodiment of the invention.

FIG. 3 is a block diagram of a networked system 300 configured to handle refund requests in accordance with an embodiment of the invention. System 300 includes a client device 310, a merchant server 340, and a payment service provider server 370 in communication over a network 360. Payment service provider server 370 may be maintained by a payment provider, such as PayPal, Inc. of San Jose, Calif.

Client device 310, merchant server 340, and payment service provider server 370 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of system 300, and/or accessible over network 360.

Network 360 may be implemented as a single network or a combination of multiple networks. For example, in various embodiments, network 360 may include the Internet or one or more intranets, landline networks, wireless networks, and/or other appropriate types of networks.

Client device 310 may be implemented using any appropriate combination of hardware and/or software configured for wired and/or wireless communication over network 360. For example, in one embodiment, client device 310 may be implemented as a personal computer of a user 305 in communication with the Internet. In other embodiments, client device 310 may be implemented as a wireless telephone, personal digital assistant (PDA), notebook computer, and/or other types of computing devices.

As shown, client device 310 may include one or more browser applications 315 which may be used, for example, to provide a convenient interface to permit user 305 to browse information available over network 360. For example, in one embodiment, browser application 315 may be implemented as a web browser configured to view information available over the Internet.

Client device 310 may also include one or more toolbar applications 320 which may be used, for example, to provide client-side processing for performing desired tasks in response to operations selected by user 305. In one embodiment, toolbar application 320 may display a user interface in connection with browser application 315 as further described herein.

Client device 310 may further include other applications 325 as may be desired in particular embodiments to provide desired features to client device 310. For example, in various embodiments, such other applications 325 may include security applications for implementing client-side security features, programmatic client applications for interfacing with appropriate application programming interfaces (APIs) over network 360, or other types of applications. Applications 325 may also include email applications that allow user 305 to send and receive emails through network 360. Client device 310 includes one or more user identifiers 330 which may be implemented, for example, as operating system registry entries, cookies associated with browser application 315, identifiers associated with hardware of client device 310, or other appropriate identifiers. In one embodiment, user identifier 330 may be used by a payment service provider to associate user 305 with a particular account maintained by the payment service provider as further described herein.

Merchant server 340 may be maintained, for example, by an on-line merchant offering various products and/or services in exchange for payment to be received over network 360, including refund requests. In this regard, merchant server 340 includes a database 345 identifying available products and/or services (e.g., collectively referred to as items) which may be made available for viewing and purchase by user 305. Accordingly, merchant server 340 also includes a marketplace application 350 which may be configured to serve information over network 360 to browser 315 of client device 310. For example, in one embodiment, user 305 may interact with marketplace application 350 through browser applications over network 360 in order to search and view various products or services identified in database 345.

Merchant server 340 also includes a checkout application 355 which may be configured to facilitate the purchase by user 305 of goods or services identified by marketplace application 350. In this regard, checkout application 355 may be configured to accept payment information from user 305 and/or from payment service provider server 370 over network 360.

In one embodiment, merchant server 340 further includes a refund application 335 which may be configured to process refund requests from user 305 on purchases made with the merchant. For example, in one embodiment, refund application 335 may be configured to receive refund requests, determine payment/refund history of the user, rate the user for refund abuse, and determine whether a refund is to be made, with such information communicated to payment service provider server 370 for association with various user accounts maintained by payment service provider server 370.

Payment service provider server 370 may be maintained, for example, by an online payment service provider which may provide payment on behalf of user 305 to the operator of merchant server 340. In this regard, payment service provider server 370 includes one or more payment applications 375 which may be configured to interact with client device 310 and/or merchant server 340 over network 360 to facilitate the purchase of goods or services by user 305 of client device 310 from merchant server 340. In one embodiment, payment service provider server 370 may be provided by PayPal, Inc.

Payment service provider server 370 also maintains a plurality of user accounts 380, each of which may include account information 385 associated with individual users. For example, in one embodiment, account information 385 may include private financial information of users of devices such as account numbers, passwords, credit card information, bank information, or other financial information which may be used to facilitate online transactions by user 305. Advantageously, payment application 375 may be configured to interact with merchant server 340 on behalf of user 305 during a transaction with checkout application 355 to track and manage purchases made by users.

In particular, payment service provider server 370 also provides a refund processing application 390 which may be configured to receive refund information from merchant server 340 and/or users for storage in a refund database 395. Refund processing application 390 and refund database 395 may be part of payment application 375. Refund application 390 may be further configured to select refund records from refund database 395 for refund processing and provide such information to merchants and/or users.

Payment service provider server 370 further includes a refund generating application 396 which may be configured to generate and process refund determinations requested by user 305 and/or a merchant. For example, in one embodiment, refund generating application 396 may be configured to generate and distribute refund information to payment service provider server 370 for association with various user accounts maintained by payment service provider server 370.

Figure 4:
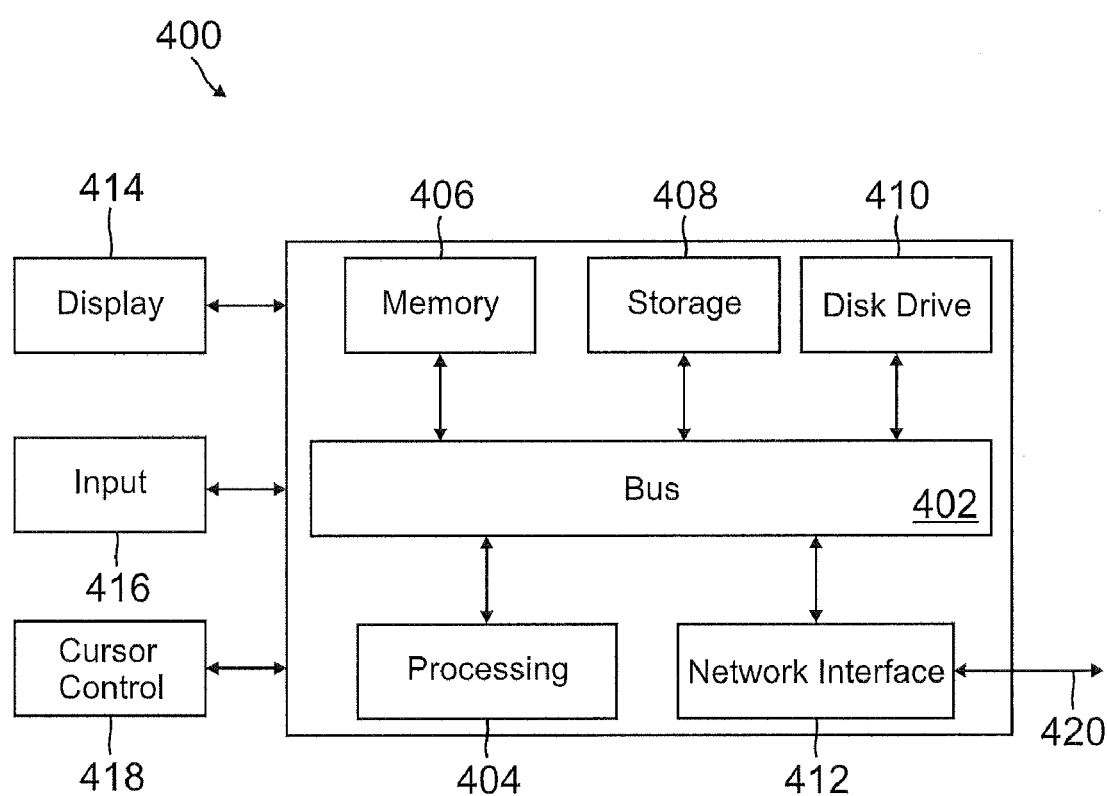
FIG. 4 is a block diagram of a computer system suitable for implementing one or more embodiments of the present disclosure.

FIG. 4 is a block diagram of a computer system 400 suitable for implementing one or more embodiments of the present disclosure. In various implementations, the user device may comprise a personal computing device (e.g., a personal computer, laptop, cell phone, PDA, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

In accordance with various embodiments of the present disclosure, computer system 400, such as a personal computer and/or a network server, includes a bus 402 or other communication mechanism for communicating information, which interconnects subsystems and components, such as a processing component 404 (e.g., processor, micro-controller, digital signal processor (DSP), etc.), a system memory component 406 (e.g., RAM), a static storage component 408 (e.g., ROM), a disk drive component 410 (e.g., magnetic or optical), a network interface component 412 (e.g., modem or Ethernet card), a display component 414 (e.g., CRT or LCD), an input component 416 (e.g., keyboard, keypad, or virtual keyboard), and a cursor control component 418 (e.g., mouse, pointer, or trackball). In one implementation, disk drive component 410 may comprise a database having one or more disk drive components.

In accordance with embodiments of the present disclosure, computer system 400 performs specific operations by processor 404 executing one or more sequences of instructions contained in system memory component 406, such as described above with respect to the merchant and/or payment provider in FIGS. 1 and 2. Such instructions may be read into system memory component 406 from another computer readable medium, such as static storage component 408 or disk drive component 410. In other embodiments, hard-wired circuitry may be used in place of or in combination with software instructions to implement the present disclosure.

Logic may be encoded in a computer readable medium, which may refer to any medium that participates in providing instructions to processor 404 for execution. Such a medium may take many forms, including but not limited to, non-volatile media, volatile media, and transmission media. In various implementations, non-volatile media includes optical or magnetic disks, such as disk drive component 410, volatile media includes dynamic memory, such as system memory component 406, and transmission media includes coaxial cables, copper wire, and fiber optics, including wires that comprise bus 402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by a communication link 420 to the network (e.g., such as a LAN, WLAN, PTSN, and/or various other wired or wireless networks, including telecommunications, mobile, and cellular phone networks) may perform instruction sequences to practice the present disclosure in coordination with one another.

Computer system 400 may transmit and receive messages, data, information and instructions, including one or more programs (i.e., application code) through communication link 420 and a communication interface 412. Received program code may be executed by processor 404 as received and/or stored in disk drive component 4510 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, certain methods have been described for rating and treating refund abusers. Depending on the merchant and/or payment provider, numerous methods and algorithms can be used, and may even vary within a specific merchant, such as applying different algorithms based on types of refunds, types of users, etc. In addition to harder or more burdensome conditions, worse refund abusers may also be subjected to an increased number of conditions to be met for a refund. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system for performing on-line transactions, comprising:
   a memory for storing user account information, wherein the information comprises a refund abuse category for a user; and
   one or more processors in communication with the memory for
      receiving information about a refund request from a user for a purchase made by the user;
      categorizing the user into one of a plurality of refund abuse categories based on the information;
      applying one of a plurality of different refund processing criteria based on which one of the refund abuse categories the user is categorized, wherein one of the criteria is number of questions to be answered by the user and wherein higher abuse categories require more questions to be answered by users in the higher abuse categories than users in lower abuse categories; and
      refunding the purchase if conditions of the processing are met.

2. The system of claim 1, wherein the receiving, categorizing, applying, and refunding is performed by a payment provider.

3. The system of claim 1, wherein the receiving, categorizing, applying, and refunding is performed by a merchant.

4. The system of claim 1, wherein the one or more processors further notifies the user of the refund abuse category the user is categorized.

5. The system of claim 1, wherein the one or more processors further notifies the user of the refund abuse category the user is categorized if the refund abuse category changes.

6. The system of claim 1, wherein the number of conditions are the same for each refund abuse category.

7. The system of claim 1, wherein the conditions comprise responding to a Captcha, answering a set of questions, and waiting for a period of time to elapse before receiving a refund.

8. The system of claim 7, wherein the number of characters in the Captcha is different for different refund abuse categories.

9. The system of claim 1, wherein the categorizing comprises determining a percentage of refunds for the user and an average number of days between a purchase and a refund over a set period of time.

10. The system of claim 7, wherein the period of time is different for different refund abuse categories.

11. The system of claim 7, wherein the conditions further comprise an option for a merchant or a payment provider to refuse further transactions from the user.

12. The system of claim 7, wherein the one or more processors further determines whether the set of questions was answered correctly.

13. The system of claim 1, wherein the purchase is for digital goods.

14. The system of claim 1, wherein the refunding comprises crediting a purchase amount to the user's account.

15. The system of claim 14, wherein the user's account is maintained by a payment provider.

16. A non-transitory machine-readable medium comprising a plurality of machine-readable instructions which when executed by one or more processors of a server are adapted to cause the server to perform a method comprising:
   receiving information about a refund request from a user for a purchase made by the user;
   categorizing the user into one of a plurality of refund abuse categories based on the information;
   applying one of a plurality of different refund processing criteria based on which one of the refund abuse categories the user is categorized, wherein one of the criteria is number of questions to be answered by the user and wherein higher abuse categories require more questions to be answered by users in the higher abuse categories than users in lower abuse categories; and
   refunding the purchase if conditions of the processing are met.

17. The non-transitory machine-readable medium of claim 16, wherein the categorizing comprises determining a percentage of refunds for the user and an average number of days between a purchase and a refund over a set period of time.

18. The non-transitory machine-readable medium of claim 16, wherein the method further comprises notifying the user of the refund abuse category the user is categorized.

19. The non-transitory machine-readable medium of claim 16, wherein the conditions comprise responding to a Captcha, answering a set of questions, and waiting for a period of time to elapse before receiving a refund.

20. The non-transitory machine-readable medium of claim 16, wherein the purchase is for digital goods.

21. A refund management system comprising:
   means for receiving information about a refund request from a user for a purchase made by the user;
   means for categorizing the user into one of a plurality of refund abuse categories based on the information;
   means for applying one of a plurality of different refund processing criteria based on which one of the refund abuse categories the user is categorized, wherein one of the criteria is number of questions to be answered by the user and wherein higher abuse categories require more questions to be answered by users in the higher abuse categories than users in lower abuse categories; and
   means for refunding the purchase if conditions of the processing are met.

22. The system of claim 21, wherein the refunding comprises crediting a purchase amount to the user's account.

23. The system of claim 21, wherein the system is maintained by a payment provider.

24. The system of claim 21, further comprising means for notifying the user of the refund abuse category the user is categorized if the refund abuse category changes.

25. The system of claim 21, wherein the conditions comprise responding to a Captcha, answering a set of questions, and waiting for a period of time to elapse before receiving a refund.

26. The system of claim 21, wherein the purchase is for digital goods.

27. The system of claim 21, wherein the categorizing comprises determining a percentage of refunds for the user and an average number of days between a purchase and a refund over a set period of time.

* * * * *